US008443002B2

(12) United States Patent
Chandrasekar et al.

(10) Patent No.: US 8,443,002 B2
(45) Date of Patent: May 14, 2013

(54) OPERATIONALLY COMPLETE HIERARCHICAL REPOSITORY IN A RELATIONAL DATABASE

(75) Inventors: Sivasankaran Chandrasekar, Menlo Park, CA (US); Sam Idicula, Santa Clara, CA (US); Nipun Agarwal, Santa Clara, CA (US); Viswanathan Krishnamurthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/301,690

(22) Filed: Nov. 21, 2011

(65) Prior Publication Data

US 2012/0066271 A1  Mar. 15, 2012

Related U.S. Application Data

(63) Continuation of application No. 12/560,242, filed on Sep. 15, 2009, now Pat. No. 8,161,074.

(51) Int. Cl.
*G06F 17/30* (2006.01)

(52) U.S. Cl.
USPC .......................... 707/792; 707/812; 707/769

(58) Field of Classification Search .......... 707/792, 707/769
See application file for complete search history.

(56) References Cited

U.S. PATENT DOCUMENTS

| 5,500,929 | A |   | 3/1996 | Dickinson |     |
|-----------|---|---|--------|-----------|-----|
| 5,920,867 | A | * | 7/1999 | Van Huben et al. | 1/1 |
| 5,920,873 | A | * | 7/1999 | Van Huben et al. | 1/1 |
| 6,035,297 | A | * | 3/2000 | Van Huben et al. | 707/695 |
| 6,088,693 | A | * | 7/2000 | Van Huben et al. | 1/1 |
| 6,094,654 | A | * | 7/2000 | Van Huben et al. | 1/1 |

(Continued)

FOREIGN PATENT DOCUMENTS

| EP | 1459210 A1 | * | 9/2004 |
| EP | 1574969 B1 | * | 5/2007 |
| EP | 1971935 A2 | * | 9/2008 |

OTHER PUBLICATIONS

"1 Introduction to Oracle XML DB", Oracle XML DB Developer's Guide 10g Release 2 (10.2) downloaded from the Internet Aug. 3, 2009, <hpttp://downloaded.oracle.com/docs/cd/B19306_01/appdev.102/b14259 . . . >28 pages.

(Continued)

*Primary Examiner* — Jean M Corrielus
(74) *Attorney, Agent, or Firm* — Hickman Palermo Truong Becker Bingham Wong LLP (57) ABSTRACT

A modular repository is described, where operational features may be implemented without the need to scan every resource included in the modular repository. A modular repository includes a dedicated set of database objects containing all information needed to access the resources in the repository. For example, the database objects of a modular repository may include those user identifier mappings and ACL mappings, etc., to which metadata in the modular repository refers. A database system may also include a mechanism through which a modular repository may be mounted under a subdirectory of a common directory in the database system. The resources of a modular repository that are mounted under the common directory may be accessed through the common directory. Further, a client may query the resources of any modular repository mounted under the common directory by making the federated repository, represented by the common directory, the context of the query.

24 Claims, 7 Drawing Sheets

U.S. PATENT DOCUMENTS

| | | | |
|---|---|---|---|
| 6,754,664 | B1 | 6/2004 | Bush |
| 6,965,903 | B1 | 11/2005 | Agarwal et al. |
| 7,752,189 | B2 | 7/2010 | Yamashita |
| 7,840,590 | B2 | 11/2010 | Tam et al. |
| 8,161,074 | B2 * | 4/2012 | Chandrasekar et al. ...... 707/792 |
| 2005/0192955 | A1 | 9/2005 | Farrell |
| 2005/0198073 | A1 * | 9/2005 | Becks et al. ............... 707/104.1 |
| 2006/0173873 | A1 * | 8/2006 | Prompt et al. ................ 707/100 |
| 2007/0294289 | A1 | 12/2007 | Farrell |

OTHER PUBLICATIONS

"22 SQL Access Using RESOURCE_VIEW and PATH_VIEW" Oracle® XML DB Developer's Guide 10g Release 2 (10.2) downloaded from the Internet Aug. 4, 2009 <http://download.oracle.com/docs/cd/B19306_01/appdev.102/b14259 . . . > 21 pages.

* cited by examiner

OPERATIONALLY COMPLETE HIERARCHICAL REPOSITORY IN A RELATIONAL DATABASE

CROSS-REFERENCE TO RELATED APPLICATIONS; BENEFIT CLAIM

This application claims the benefit as a Continuation of application Ser. No. 12/560,242, filed Sep. 15, 2009 now U.S. Pat. No. 8,161,074, the entire contents of which is hereby incorporated by reference as if fully set forth herein, under 35 U.S.C. §120. The applicant hereby rescinds any disclaimer of claim scope in the parent application or the prosecution history thereof and advises the USPTO that the claims in this application may be broader than any claim in the parent application.

FIELD OF THE INVENTION

The present invention relates to operational features of a database system, and specifically to a modular hierarchically-organized repository that facilitates implementation of operational features thereon.

BACKGROUND

In typical relational database systems, users store, update, and retrieve information by interacting with user applications ("clients"). The clients respond to the user's interaction by submitting commands to a database application responsible for maintaining the database (a "database server"). The database server responds to the commands by performing the specified operations on the database.

Relational database systems, herein referred to as simply "database systems", generally excel at handling structured content that maps to rows and columns. These traditional relational databases also offer operational features that allow clients to deploy the structured content database efficiently. Examples of operational features include partitioning, replication, and export/import of data, etc. Data with which operational features may be implemented by a database system is known as operationally complete data.

Data partitioning allows a client to manage a particular data partition independently from other data partitions. Import and export features allow a client to move data that is organized according to a particular logical model from one database system to another database system without losing the organization of the data. Data that is organized according to a particular logical model may include logical nodes of data arranged in a particular hierarchy, where the relationships between the logical nodes comprises the logical model.

Traditional relational database systems have been extended to manage hierarchically-organized data, which is also known as "unstructured" data for the purposes of relational database systems. Examples of unstructured data include file system data, and XML data, etc. For example, the Oracle XML DB Repository is a component of Oracle Database that is optimized for handling XML data. The Oracle XML DB Repository is described in more detail in the Oracle XML DB Developer's Guide, 10g Release 2 (10.2) Part Number B14259-02, Chapter 1, accessed on Jul. 31, 2009.

Thus, a database system may include a hierarchical repository, also referred to herein as simply a "repository", which may include one or more hierarchically-organized resources. Such resources may include any kind of data that can be identified using a path, such as files, folders, xml nodes, etc. In one embodiment of the invention, examples of resources do not include relationally structured data, known as tuples.

A repository may be conceptually viewed as a table that stores the content of the resources in the repository, and metadata describing features of the resources, in one or more relational columns. The metadata describing features of the particular resource may include one or more paths to the resource within the repository, creation date, last modified time, content size, owner identifier, etc.

Traditionally, it has been difficult to provide operational features for repositories with hierarchical content. Specifically, to implement operational features on a hierarchical repository, each resource in the repository traditionally is scanned, making implementation of operational features expensive to implement for hierarchical repositories.

To illustrate, repository metadata traditionally refers to information that is not stored within the context of the repository's session, which may make it difficult to implement import/export features for the repository. For example, a particular repository includes owner identifiers for each resource in the repository. The owner identifiers map to user names in a user table that is not stored within the client session of the repository. In order to export the repository, the database system must scan each resource in the repository to determine the user name that corresponds to the resource based on the user table.

Moreover, a repository that shares data with other database entities may cause replication of the repository to be difficult. For example, the repository of the previous example shares the user table with various database security tables. Thus, to replicate the repository, the database system also replicates pertinent entries in the shared user table. However, it may not be appropriate to replicate all entries in the shared user table, e.g., if some of the entries that are used only by the database security tables include sensitive information. Thus, to replicate the repository, the database system scans each resource in the repository to determine which of the rows of the shared user table should be replicated.

Traditionally, a single repository in a database system may include various types of resources. This diversity of resources within a repository may cause creating a partition for one or more of the types of resources in the repository to be difficult. For example, a particular repository includes both purchase order resources and employee information resources. To partition purchase order resources from employee information resources, all of the tables corresponding to the repository are visited, and each resource is scanned to determine the type of each respective resource.

Furthermore, the resource metadata in a repository may include references to physical locations of data. These physical row identifiers, or "row identifiers", are an optimized means of referring to data within the database system. However, the physical locations of the data structures in one database system lose meaning when imported to a different database system. Therefore, to export a repository that includes physical row identifiers in the metadata for the resources of the repository, each resource is scanned to resolve the row identifier of the resource.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Thus, modular repositories are described herein, where operational features may be implemented on a modular repository without the need to scan every resource included in the modular repository. Such a modular repository includes a dedicated set of database objects that contain all information needed to access the resources in the repository, including all content tables needed for the resources. For example, the database objects of a modular repository may include those user identifier mappings and ACL mappings, etc., to which metadata in the modular repository refers.

A database system may also include a mechanism through which a modular repository may be mounted under a subdirectory of a common directory in the database system. The resources of a modular repository that are mounted under the common directory may be accessed through the common directory. The set of repositories represented by such a common directory is referred to herein as a "federated repository". Further, a client may query the resources of any modular repository mounted under the common directory by making the federated repository, represented by the common directory, the context of the query.

Modular repositories allow easy implementation of operational features on the resources of the repository. Each resource in such a modular repository need not be scanned for an export/import event because all information needed for the resources of a modular repository is included in the database objects for the modular repository. Furthermore, a modular repository maintains physical row identifiers only in index structures, which may be rebuilt without scanning the resources. Also, the database objects dedicated to a modular repository may be grouped into their own tablespace, which allows the data therein to be exported by simply exporting the corresponding tablespace. A modular repository easily acts as partitioned data because a modular repository may include only one type of resource. Thus, without scanning the resources in the modular repository, a modular repository is separately manageable from other resources in the database system.

Modular Repositories

A modular repository is described herein that contains all of the information for a particular set of hierarchically-organized resources, also referred to herein as "data collection". Such a modular repository includes a set of database objects in which only information for the corresponding set of hierarchically-organized resources is stored. Examples of database objects include tables, indices, materialized views, etc. In one embodiment of the invention, the database objects of a modular repository are located completely within the context of a particular client schema.

A modular repository is not dependent on data outside the database objects dedicated to the repository, thus allowing implementation of operational features on the repository without having to scan each resource of the modular repository, as described in further detail below. Thus, a modular repository includes all information needed to access a particular set of resources, and no information that is required to access the resources is stored in any database object outside of the modular repository. Accessing the resources of a modular repository may include querying data of the resources, updating the resources, managing the resources, and any other function that may be performed on the resources of a repository in the context of a database system.

The database objects of a modular repository may be organized in any number of ways within the embodiments of the invention. In one embodiment of the invention, the particular set of database objects for a modular repository are explicitly assigned to the modular repository by the database system that manages the database objects. For example, a set of database objects may be created in a dedicated tablespace to be the database objects for a particular modular repository. Also, a database system may create and populate a modular repository upon the request of a client.

In one embodiment of the invention, constraints may be placed on a modular repository to restrict the type of resource that is included in the modular repository. For example, a constraint may be placed on a particular modular repository to restrict the resources in the modular repository to employee resources only. In this embodiment of the invention, if a client attempts to add a purchase order resource to the particular modular repository, the modular repository would cause the database system to throw an error, and the resource would not be added to the particular modular repository. A constraint may include a list of resource types allowed to be added to a particular modular repository.

Figure 1:
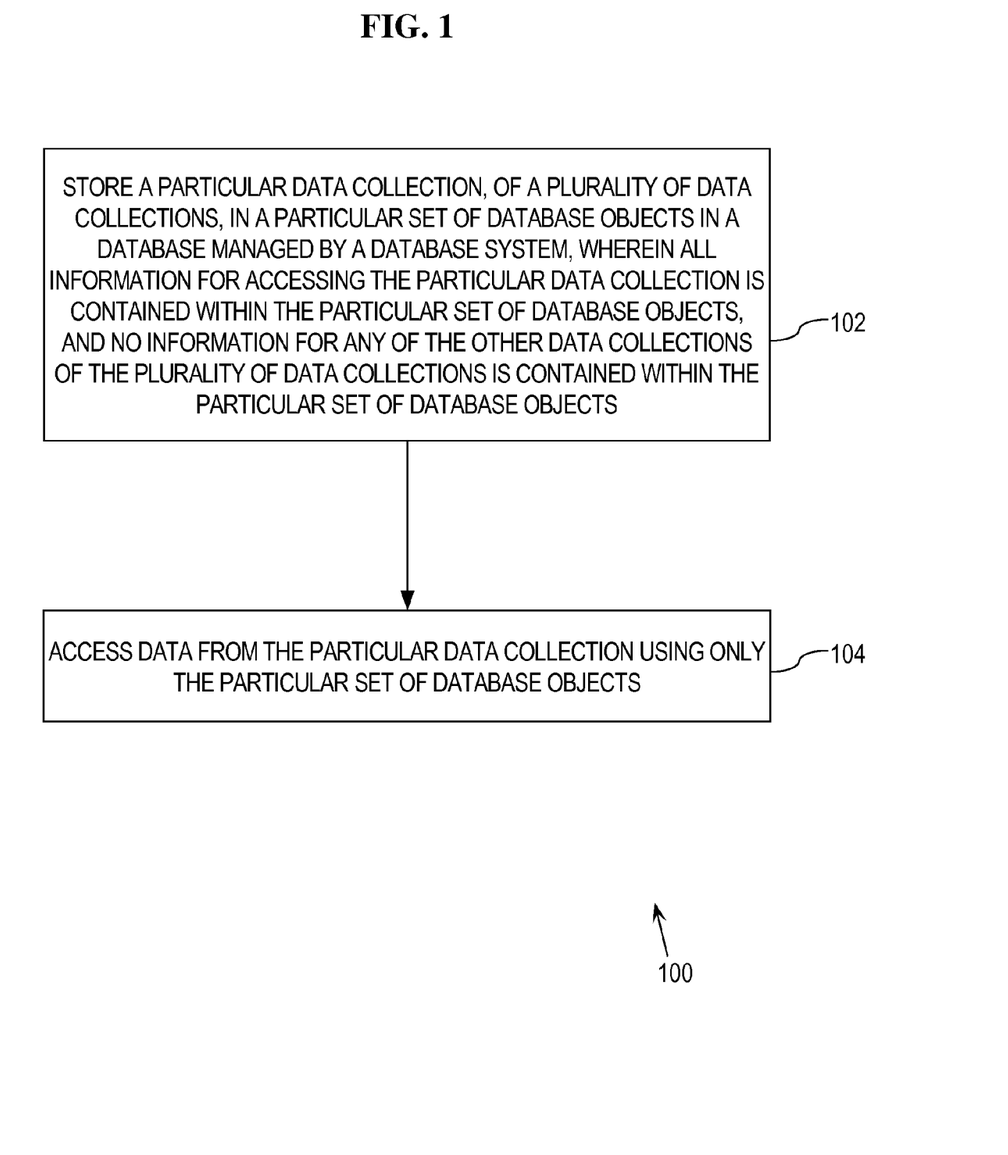
FIG. 1 illustrates an example method for storing and accessing data in a modular repository.

FIG. 1 illustrates an example method 100 for storing and accessing data in a modular repository. At step 102, a particular data collection of a plurality of data collections is stored in a particular set of database objects in a database managed by a database system, wherein all information for accessing the particular data collection is contained within the particular set of database objects, and no information for any of the other data collections of the plurality of data collections is contained within the particular set of database objects.

Figure 2:
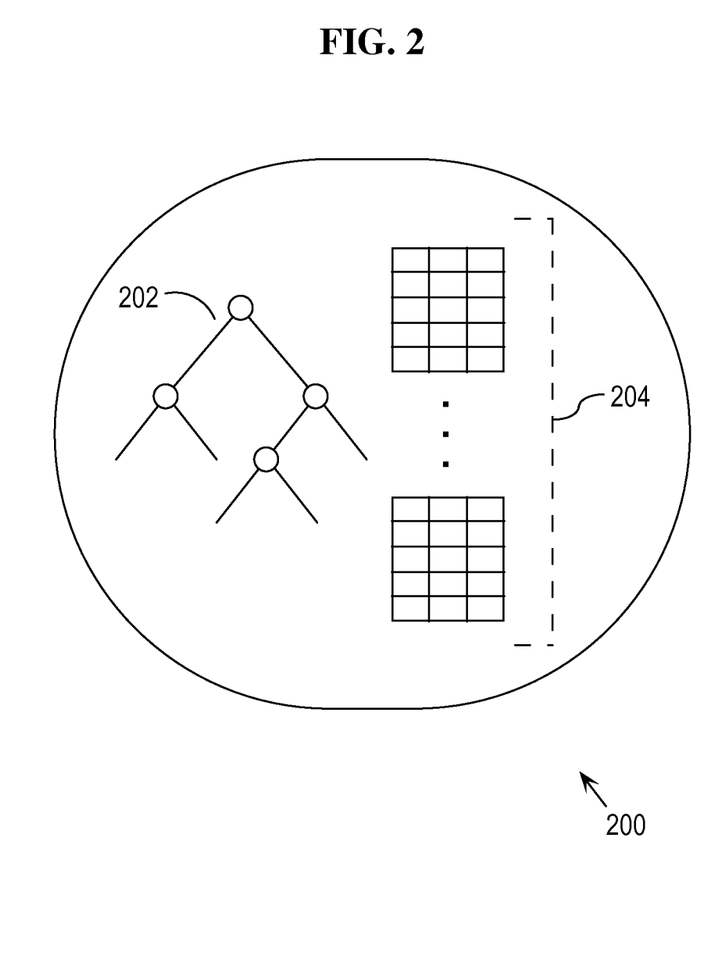
FIG. 2 illustrates an example modular repository that stores, in database objects, all information necessary to access the corresponding hierarchically-organized resources.

For example, FIG. 2 illustrates an example modular repository 200 that stores, in database objects 204, all information necessary to access hierarchically-organized resources 202.

Thus, database objects 204 include the content of resources 202 and metadata describing the features of resources 202. Database objects 204 further include any data that is necessary to resolve any references in the metadata for resources 202. For example, metadata for a particular resource in modular repository 200 may include a user identifier to refer to the identity of a particular user, such as the owner of the particular resource. In this example, database objects 204 include a mapping of the user identifier to a user identity, such as a user name, as described in further detail below.

At step 104 of method 100, data from the particular data collection is accessed using only the particular set of database objects. For example, the database system receives a query on resources 202. To evaluate the query with respect to resources 202, the database system only accesses one or more database objects in database objects 204.

Adding a Resource to a Modular Repository

Metadata for the resources in a modular repository may include information, such as user identifiers, that are references to other information stored in shared tables. A shared table is a database object that includes information that is referred to by various entities of a database system. For example, user identifiers generally refer to unique user identities, such as user names, that are generally stored in one or more shared user tables. Information in shared tables may be required for many kinds of access to the resources of a modular repository. Therefore, the database objects of a modular repository include copies of those portions of shared tables that are referred to by the resource metadata in the repository. These copies of information from shared tables are used only by the database objects of the modular repository. While user identifiers are used to illustrate shared table information, other information is also traditionally stored in shared tables, such as access control lists ("ACL"), database links, etc.

Figure 3:
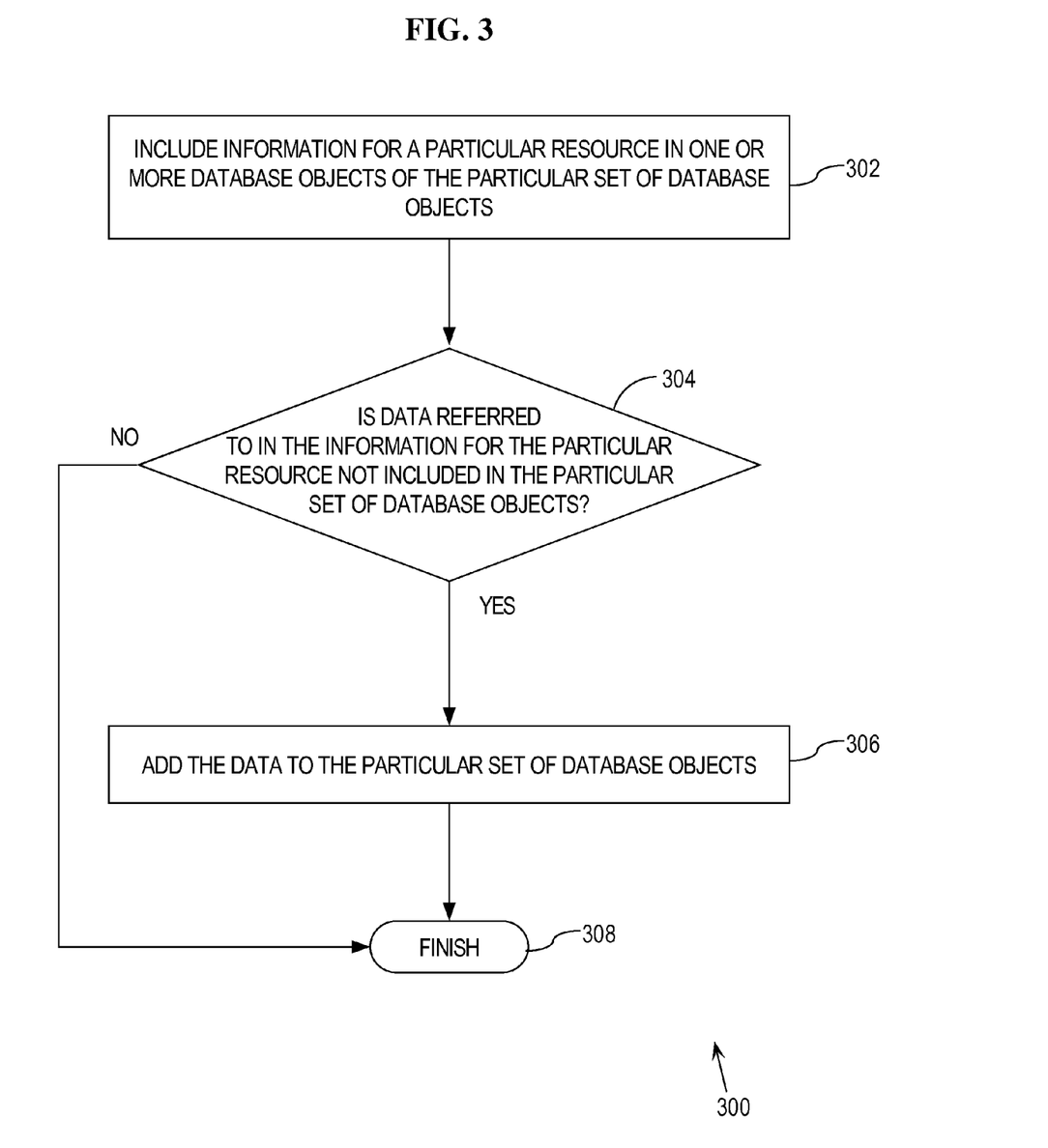
FIG. 3 illustrates an example method of adding information for a resource to a modular repository, including all information needed to access the resource.
Figure 4:
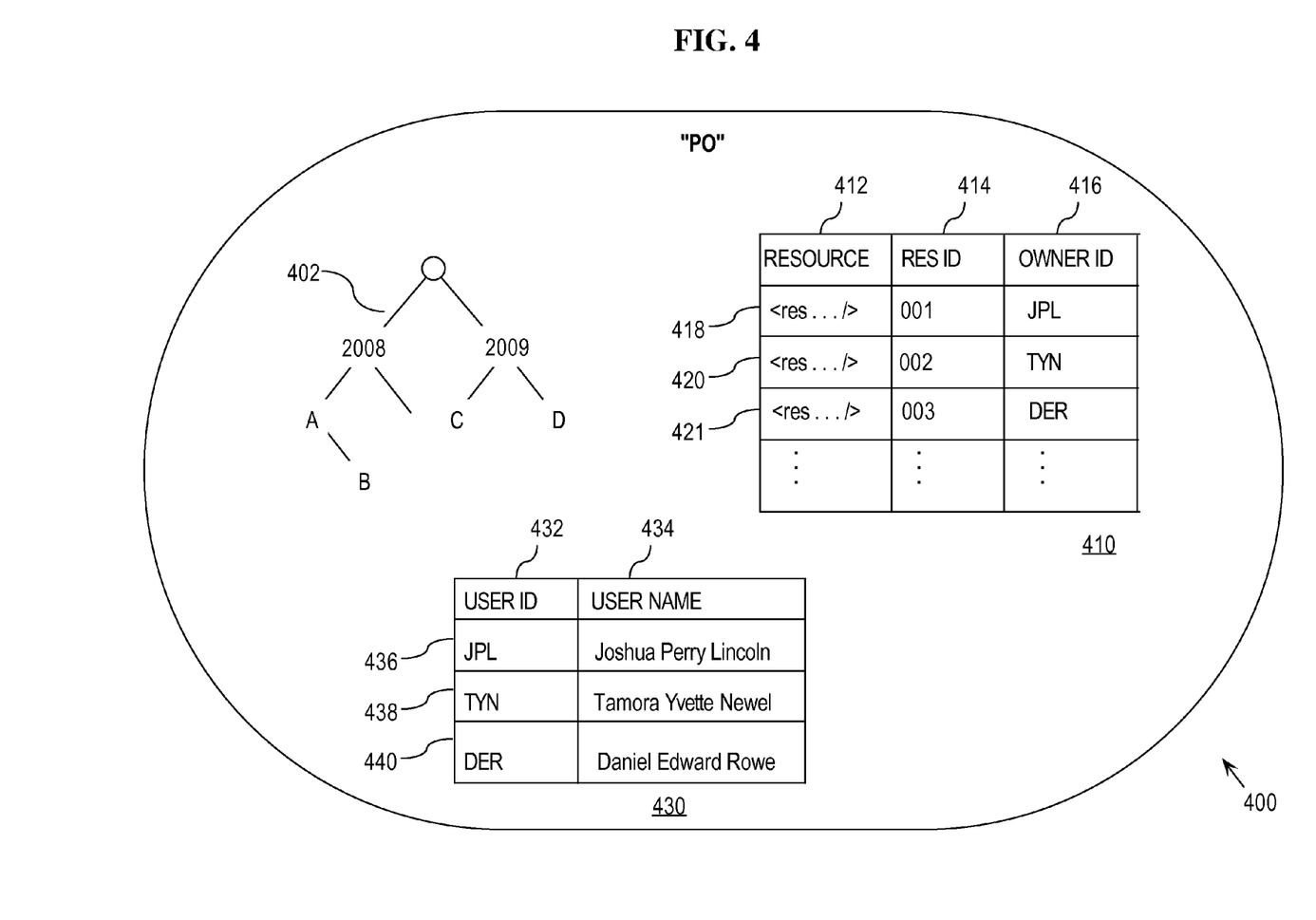
FIG. 4 illustrates an example modular repository.

FIG. 3 illustrates an example method 300 of adding information for a resource to a modular repository, including all information needed to access the resource. To illustrate method 300, modular repository 400 is shown in FIG. 4, in which a hierarchically-organized resources 402 include resources representing purchase orders. Thus, modular repository 400 is known as "PO" within the database system.

The content and metadata for resources 402 are stored in resource table 410. Resource table 410 includes resource column 412 that represents the content of each resource in resources 402, res identifier column 414 that represents a unique identifier for each resource in resources 402, and owner identifier column 416 that represents a user identifier of the owner of each resource in resources 402. The values shown in rows 418 and 420 are non-limiting examples of content and metadata for resources 402. For ease of illustration, user identifiers in modular repository 400 are represented as letters, but may be represented by numbers, etc.

Modular repository 400 also includes user table 430 that maps user identifiers at column 432 to corresponding user names at column 434. Only user identifiers included in resource table 410 are mapped to user names in user table 430. The values shown in rows 436-440 of user table 430 are non-limiting examples of user table entries. Furthermore, a modular repository, such as modular repository 400, may include information that is not illustrated in FIG. 4, and may not include information that is illustrated in FIG. 4.

At step 302 of method 300, information for a particular resource is included in one or more database objects of the particular set of database objects. For example, the database system managing modular repository 400 includes information about a resource corresponding to res identifier "004" with an owner identifier of "SJK" to modular repository 400. Thus, the database system includes a new row in resource table 410 with at least (a) the content of the new resource, (b) the res identifier, "004", and (c) the owner identifier, "SJK".

At step 304, it is determined whether data referred to in the information for the particular resource is not included in the particular set of database objects. In other words, it is determined whether any information in a table that is shared by various entities in the database system is required to interpret information included in a modular repository. Continuing with the previous example, the user identifier, "SJK", refers to the user identity of the owner of the new resource. The database system determines that the user identity corresponding to the user identifier, "SJK", is not included in user table 430 of modular repository 400.

In response to determining that the data referred to in the information for the particular resource is not included in the particular set of database objects, method 300 continues to step 306, at which the data is added to the particular set of database objects. For example, the database includes the user name corresponding to user identifier "SJK" in modular repository 400, i.e., at user table 430. The database system may obtain this information in any number of ways, including by querying a database object in the database system that is not included in modular repository 400, such as a shared user table. The method then finishes at step 308.

As a further example, the database system includes, in modular repository 400, information for another resource corresponding to res identifier "005" and owner identifier "DER". According to step 304 of method 300, the database system determines that none of the information included in modular repository refers to data that is not included in modular repository 400. Specifically, the database system determines that user resource table 410 includes row 440 corresponding to user identifier "DER". As such, method 300 finishes at step 308.

The database objects in modular repository 400, such as resource table 410, and user table 430, etc., store only information pertaining to resources 402. Thus, none of the mappings found in user table 430 are used to access user identifiers in database system objects outside of modular repository 400. Also, all of the information needed to access resources 402 is included in modular repository 400.

Querying a Modular Repository

Because the database objects of a modular repository contain all information needed to access the resources in the modular repository, a query on the resources of a modular repository need only access the database objects of the modular repository to evaluate the query.

The resources of a hierarchically-organized repository within a database system may be exposed to queries in any number of ways. For example, the Oracle XML DB exposes hierarchical XML data using predefined public views, called RESOURCE_VIEW and PATH_VIEW, described in more detail in the Oracle XML DB Developer's Guide, 10g Release 2 (10.2) Part Number B14259-02, Chapter 22, accessed on Jul. 9, 2009, at http://download.oracle.com/docs/cd/B19306_01/appdev.102/b14259/xdb18res.htm#sthref2107, the contents of which are incorporated by reference in their entirety for all purposes as if fully set forth herein. These public views provide a mechanism for using SQL to access hierarchical data stored in a repository. For purposes of illustration, modular repository 400 is exposed to queries through a public view called "public_view", which exposes hierarchical data to queries in a manner that is similar to RESOURCE_VIEW described above. Public_view includes a res column that includes information about the properties and content of each resource in modular repository 400. Public_view also includes, for each resource, a path column that includes a possible path in the hierarchy of resources 402.

To run a query against a particular modular repository, the query is scoped to the modular repository. Setting the scope of a query to a particular modular repository indicates that any path referred to in the query is relative to the root of the hierarchy of resources in the modular repository. The scope of a query may be set to a particular modular repository in any number of ways within the embodiments of the invention. For example, the scope of a session in which a particular query is to be evaluated may be set to modular repository 400, named "PO", through a command such as "session_scope=PO" implemented by the database system. Furthermore, the scope of a query may be set to a modular repository in the context of the query itself.

To illustrate in the context of modular repository 400, a client may set the scope of the client's session to modular repository 400. The client may then run the following query, Query 1, which is evaluated with respect to modular repository 400.

Query 1 SELECT path FROM public_view WHERE under_path(res, '/2008')=1

The solution set for Query 1 includes the path attribute from all rows in public_view where the resources specified in the res column of the public_view are found under "/2008", evaluated with respect to the hierarchy of resources 402 of modular repository 400.

Federated Repository

Modular repositories may be incorporated into other hierarchically-organized collections of resources. For example, a modular repository that is managed by a particular database system may be incorporated into a second hierarchical repository managed by the same database system by logically mapping the resources in the modular repository to a subdirectory of the second hierarchical repository. A subdirectory is any directory of a hierarchy, represented by a container resource, other than the root of the hierarchy.

In one embodiment of the invention, a modular repository may be mapped, or "mounted", to one or more subdirectories of a common directory in a database system. A common directory is a hierarchically-organized data structure to which resources of modular repositories may be mapped, and may be implemented in many ways within the embodiments of the invention. For example, a common directory may be a repository of hierarchical resources that is accessible in a particular client session, or that is accessible to any client of the database system at large. As another example, a common directory in a database system may identify domains to which named references within the session may be resolved, and may be established for a period of time, such as for the duration of a client session.

The database system managing a particular modular repository maintains one or more logical mappings to track the one or more subdirectories at which the particular modular repository is mounted. A common directory having one or more modular repositories mounted thereto is referred to herein as a "federated repository".

Figure 5:
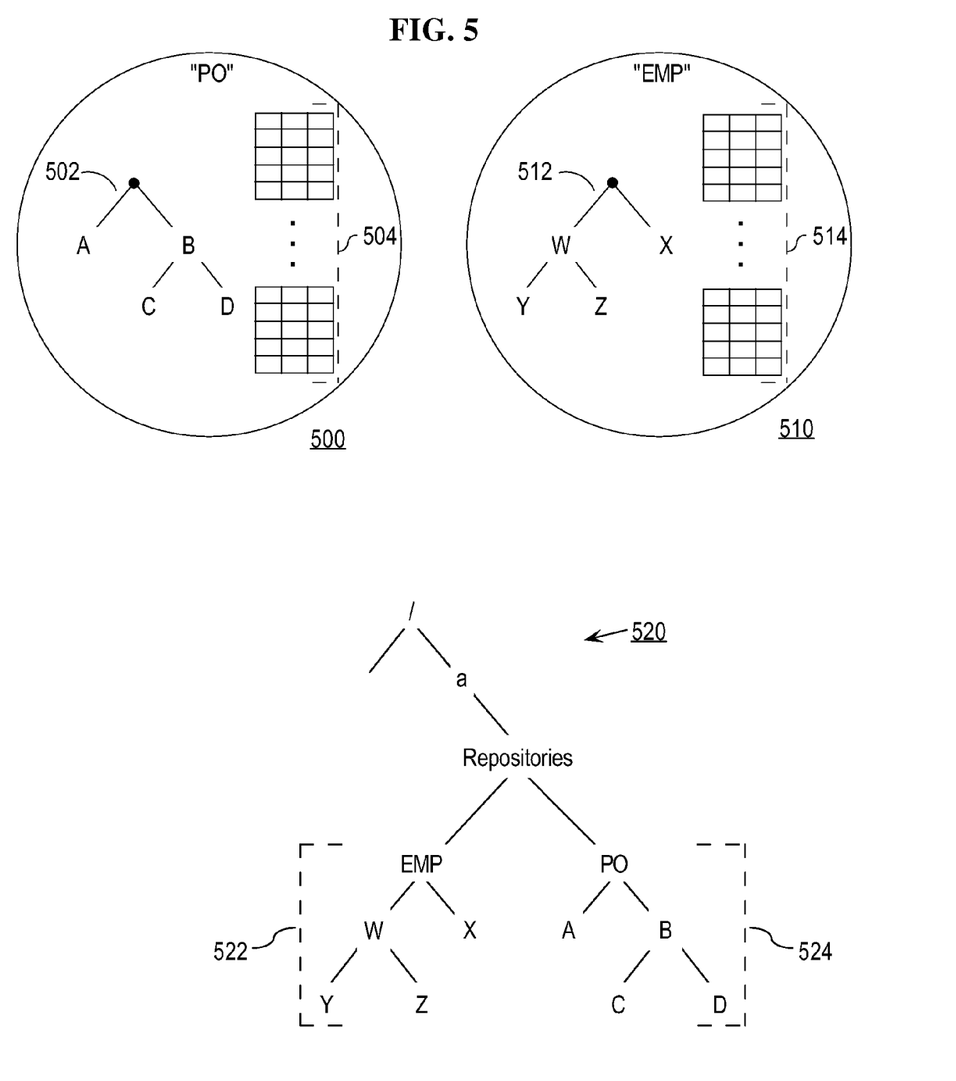
FIG. 5 illustrates example modular repositories, and an example mapping of the resources of these modular repositories to a common directory of a database system.

For example, FIG. 5 illustrates modular repositories 500 and 510, each of which contains all of the information needed to access purchase order resources 502 and employee resources 512, respectively, as described above. FIG. 5 also illustrates the logical path structure of an example mapping of the resources of modular repositories 500 and 510 to subdirectories of a common directory 520 of the database system that manages modular repositories 500 and 510.

To mount a modular repository to a subdirectory of a common directory, a mount repository API may be defined that includes a mount command, such as "MOUNT(<modular_repository_name>, <subdirectory_path>)". Using this mount command, a client may mount resources 502 of modular repository 500, named "PO", to a subdirectory of common directory 520, "/a/Repositories/PO", in the following manner: "MOUNT(PO, '/a/Repositories/PO')". This command results in the resources of modular repository 500 being logically available under the specified subdirectory, as illustrated at subdirectory 524 of common directory 520. Similarly, resources 512 of modular repository 510 may be mounted to a subdirectory of common directory 520 as follows: "MOUNT(EMP, '/a/Repositories/EMP')", illustrated at subdirectory 522 of common directory 520. In one embodiment of the invention, the last item in the subdirectory path given in a mount command is logically interpreted as the root of the hierarchy of resources in the mapped modular repository.

FIG. 5 illustrates a non-limiting example of mapping one or more modular repositories under a common directory. A modular repository may be mapped to any location in a common directory, and two or more modular repositories may be mapped to the same location in a common directory. In the case of multiple modular repositories being mapped to the same location, the database system checks the resources for name conflicts, and throws errors if any conflicts are found. A modular repository need not be mounted to a subdirectory that corresponds to the name of the modular repository, and is shown as such in FIG. 5 for ease of illustration.

Using a Federated Repository

When a modular repository is mounted to a common directory, a particular resource of the modular repository may be accessed by prepending the path of the mount point of the modular repository to the path of the resource in the hierarchy of the modular repository. For example, resource "Y", located at "/W/Y" in the hierarchy of resources 512 of modular repository 510, may be accessed using the path "/a/Repositories/EMP/W/Y" in common directory 520.

Thus, the resources of a mounted modular repository are accessible through the common directory by using an absolute path, i.e., a path starting at the root of a common directory. As such, resources of one mounted modular repository, e.g., modular repository 500, may be accessed from inside the scope of another mounted modular repository, e.g., modular repository 510.

Figure 6:
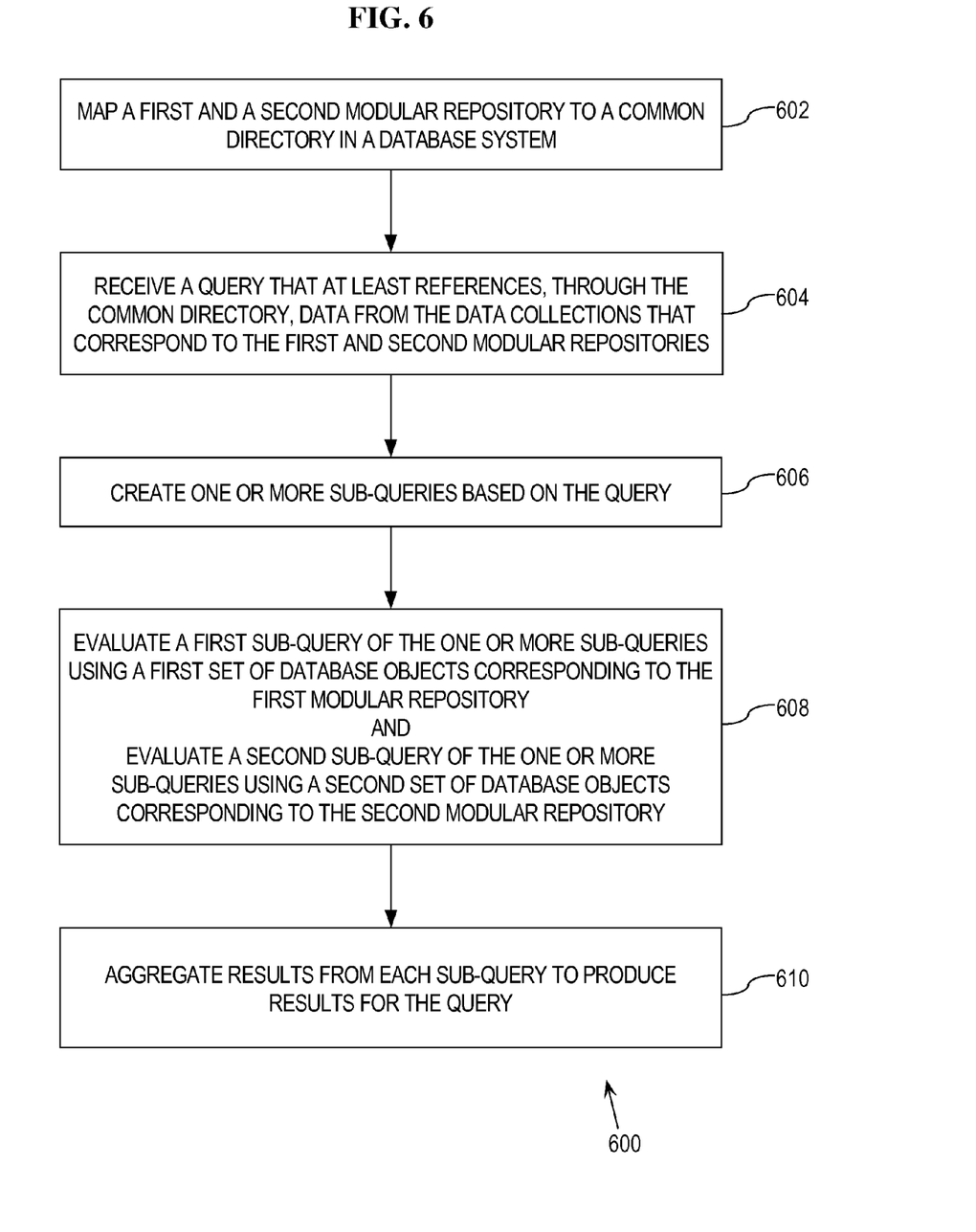
FIG. 6 illustrates an example method of performing a query on data in mounted modular repositories.

Furthermore, a client may set the scope of a particular query to the federated repository. Such a query may evaluate over the resources of any of the modular repositories mounted to the common directory. Thus, in the context of FIG. 5, a query may be run on both modular repositories 500 and 510 by setting the scope of the query to the federated repository represented by common directory 520. For example, the scope of a session may be set to the federated repository using the following example command: "session_scope= Federated_Repository" implemented by the database system. FIG. 6 illustrates an example method 600 of performing a query on data in mounted modular repositories.

At step 602, a first and a second modular repository are mapped to a common directory in a database system. For example, a database system maps modular repositories 500 and 510 to common directory 520, as illustrated in FIG. 5.

At step 604, a query is received that at least references, through the common directory, data from the data collections that correspond to the first and second modular repositories. For example, with the client session scope set to the federated repository corresponding to common directory 520, a client executes the following query, Query 2.

```
Query 2    SELECT path FROM public_view
           WHERE creationDate > to_date( '01-SEP-02',
           'dd-mmm-yy')
```

Thus, the database system receives Query 2 that selects the paths of those resources in common directory 520—which is the scope of the query—that have a corresponding creation date after Sep. 1, 2002.

At step 606, one or more sub-queries are created based on the query. For example, the database system creates three sub-queries based on Query 2. Specifically, the database system creates a query selecting paths conforming to the criteria given in Query 2 from each of (a) modular repository 500, (b) modular repository 510, and (c) the resources in common directory 520 that are not included in one of modular repository 500 and modular repository 510.

At step 608, a first sub-query of the one or more sub-queries is evaluated using a first set of database objects corresponding to the first modular repository and a second sub-query of the one or more sub-queries is evaluated using a second set of database objects corresponding to the second modular repository. For example, the database system evaluates the sub-query created by the database system for modular repository 500 using only information from database objects 504, which are dedicated to modular repository 500. Likewise, the database system evaluates the sub-query created by the database system for modular repository 510 using only information from database objects 514, which are dedicated to modular repository 510.

At step 610, results from each sub-query are aggregated to produce results for the query. For example, results from each of (a) the query for modular repository 500, (b) the query for modular repository 510, and (c) the query for the resources in common directory 520 that are not included in one of modular repository 500 and modular repository 510 are aggregated. Aggregating query results may include ensuring that each path in the results for the query is in the form of an absolute path from the root of common directory 520.

As a further example, a client may evaluate the following Query 3 with the session scope set to the federated repository corresponding to common directory 520.

```
Query 3    SELECT path FROM public_view
           WHERE creationDate > to_date( '01-SEP-02',
           'dd-mmm-yy')
           AND under_path(res, '/a/Repositories/PO') = 1
```

Thus, the database system receives Query 3 that selects the paths of those resources in common directory 520 that occur under the subdirectory "/a/Repositories/PO", and that have a corresponding creation date after Sep. 1, 2002.

According to method 600, the database system creates one or more sub-queries based on Query 3. Because Query 3 only evaluates over the resources that occur under the subdirectory "/a/Repositories/PO", and the resources of modular repository 500 are the only resources located in the specified subdirectory, the database system creates only one sub-query to be evaluated using database objects 504 that are dedicated to modular repository 500. To create the results set for Query 3, the database system ensures that all of the paths in the results for Query 3 are absolute paths from the root of common directory 520, because Query 3 is in the scope of the federated repository.

Logical Identifiers

As previously indicated, many repositories include references to physical locations of data, i.e., "physical row identifiers" or simply "row identifiers". These physical row identifiers may be used to refer to parent or child resources from within a particular resource in a repository, etc. Row identifiers are not used in modular repositories because row identifiers are specific to the particular database system in which the resources reside. Thus, logical identifiers are used in modular repositories to refer to data in the modular repository. Logical identifiers uniquely map to physical locations of data, or physical row identifiers, within the scope of the modular repository in which the logical identifiers are found.

The mapping of logical identifiers to physical row identifiers in a modular repository may be stored in one or more index structures in the database objects of the modular repository. Index structures are database objects that provide one or more fast access paths to data in a database object. By mapping logical identifiers to row identifiers using one or more index structures, the database system has fast access to the row identifier corresponding to any given logical identifier that is included in the index structure.

To provide fast access paths to data in database objects, an index structure generally includes information on the physical location of data in the database objects. Thus, when an index structure is imported or replicated in a new database system, the database system rebuilds the index structure to replace old physical location information with new physical location information. As such, by maintaining all physical row identifiers of a modular repository in one or more index structures, a database system may update physical row identifiers of the modular repository without having to scan each resource of the modular repository by simply rebuilding the index structures storing physical location information.

Applying Operational Features to a Modular Repository

A modular repository allows a database system to easily implement operational features for the resources of the modular repository. In one embodiment of the invention, an operational feature is easily implemented on a particular repository if the implementation of the feature does not involve scanning each resource of the repository.

For example, a modular repository according to the embodiments of the invention is easily exported from one database system and imported to another database system. Each resource in such a modular repository need not be scanned for such an export/import event because all information needed for the resources of a modular repository is included in the database objects for the modular repository. Furthermore, a modular repository maintains physical row identifiers only in index structures, which may be rebuilt without scanning the resources. Also, in the embodiment of the invention where the database objects of a modular repository are grouped into their own tablespace, a modular database may be exported by simply exporting the corresponding tablespace.

Moreover, a modular repository easily acts as partitioned data because a modular repository may include only one type of resource. Thus, without scanning the resources in the modular repository, a modular repository is separately manageable from other resources in the database system. And, in the embodiment of the invention where the database objects of a modular repository are grouped into their own tablespace, all of the database objects for the modular repository may be modified by modifying attributes of the corresponding tablespace.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
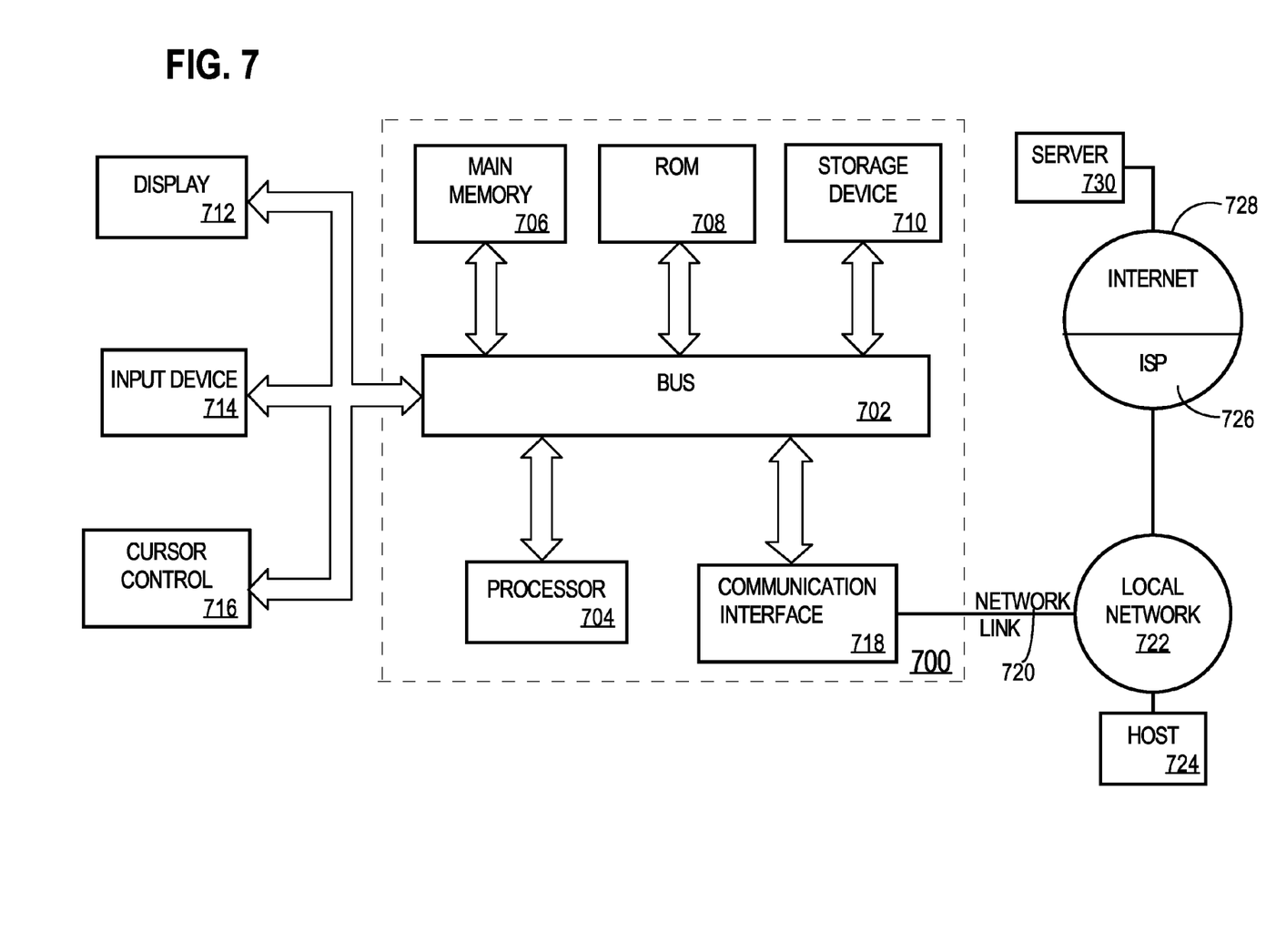
FIG. 7 is a block diagram of a computer system on which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-executed method comprising:
   storing a particular hierarchically-organized collection of resources in a particular set of database objects in a database managed by a first database system;
   mounting, to a particular subdirectory of a common directory managed by the first database system, the particular hierarchically-organized collection of resources, stored in the particular set of database objects;
   receiving a particular path that refers to a particular resource of the particular hierarchically-organized collection of resources, wherein the particular path includes a first path representing the particular subdirectory of the common directory; and
   accessing the particular resource using the particular path, wherein the method is performed by one or more computing devices.

2. The computer-executed method of claim 1, wherein the particular path further includes a second path representing a location, of the particular resource, relative to a root of the particular hierarchically-organized collection of resources.

3. The computer-executed method of claim 1, wherein the particular set of database objects includes all referenced data for which identifiers are included in the particular hierarchically-organized collection of resources.

4. The computer-executed method of claim 1, further comprising:
   determining that the particular hierarchically-organized collection of resources includes a reference to particular referenced data in a shared table, wherein the shared table includes data that is referred to by one or more entities, in the first database system, that are not included in the particular set of database objects; and
   in response to determining that the particular hierarchically-organized collection of resources includes the reference to the particular referenced data in the shared table, copying the particular referenced data to a database object of the particular set of database objects.

5. The computer-executed method of claim 1, further comprising:
   receiving information for a resource to be added to the particular set of database objects;
   determining whether the information is of a type consistent with a constraint on resource types to include in the particular set of database objects; and
   responsive to determining that the information is of a type consistent with the constraint, the first database system adding the information to one or more database objects of the particular set of database objects.

6. The computer-executed method of claim 5, further comprising:
   receiving second information for a second resource to be added to the particular set of database objects; determining whether the second information is of a type consistent with the constraint on resource types to include in the particular set of database objects; and responsive to determining that the second information is not of a type consistent with the constraint, the first database system throwing an error.

7. The computer-executed method of claim 1, wherein the particular set of database objects includes one or more database tables indexed by logical identifiers; and the method further comprises associating row identifiers, identifying physical locations for rows in the one or more database tables, with the logical identifiers using one or more index structures included in the particular set of database objects.

8. The computer-executed method of claim 1, further comprising creating a tablespace for storing data for the particular set of database objects.

9. The computer-executed method of claim 1, further comprising:
   storing a second hierarchically-organized collection of resources in a second set of database objects in the database managed by the first database system, wherein the second hierarchically-organized collection of resources includes one or more second identifiers of one or more second referenced data, and the second set of database objects include the one or more second referenced data; mounting, to a second subdirectory of the common directory, the second hierarchically-organized collection of resources, stored in the second set of database objects;
   receiving a query, in context of the common directory, that requires evaluation over both the particular hierarchically-organized collection of resources and the second hierarchically-organized collection of resources; and
   evaluating the query using, at least, the particular set of database objects and the second set of database objects.

10. The computer-executed method of claim 9, wherein the step of evaluating the query further comprises:
creating a plurality of sub-queries based on the query;
evaluating a first sub-query of the plurality of sub-queries using the particular set of database objects; and
evaluating a second sub-query of the plurality of sub-queries using the second set of database objects.

11. A computer-executed method comprising:
storing a first hierarchically-organized collection of resources in a first set of database objects in a database managed by a first database system;
storing a second hierarchically-organized collection of resources in a second set of database objects in the database managed by the first database system;
mounting, to a first subdirectory of a common directory managed by the first database system, the first hierarchically-organized collection of resources, stored in the first set of database objects;
mounting, to a second subdirectory of the common directory, the second hierarchically-organized collection of resources, stored in the second set of database objects, wherein the second subdirectory is different than the first subdirectory;
receiving a query, in context of the common directory, that requires evaluation over both the first hierarchically-organized collection of resources and the second hierarchically-organized collection of resources; and
evaluating the query using, at least, the first set of database objects and the second set of database objects, wherein the method is performed by one or more computing devices.

12. The computer-executed method of claim 11, wherein the step of evaluating the query further comprises: creating a plurality of sub-queries based on the query; evaluating a first sub-query of the plurality of sub-queries using the first set of database objects; and evaluating a second sub-query of the plurality of sub-queries using the second set of database objects.

13. A non-transitory computer-readable storage medium storing instructions which, when executed by one or more processors, cause a computing device to perform steps comprising:
storing a particular hierarchically-organized collection of resources in a particular set of database objects in a database managed by a first database system;
mounting, to a particular subdirectory of a common directory managed by the first database system, the particular hierarchically-organized collection of resources, stored in the particular set of database objects;
receiving a particular path that refers to a particular resource of the particular hierarchically-organized collection of resources, wherein the particular path includes a first path representing the particular subdirectory of the common directory; and
accessing the particular resource using the particular path.

14. The computer-readable storage medium of claim 13, wherein the particular path further includes a second path representing a location, of the particular resource, relative to a root of the particular hierarchically-organized collection of resources.

15. The computer-readable storage medium of claim 13, wherein the particular set of database objects includes all referenced data for which identifiers are included in the particular hierarchically-organized collection of resources.

16. The computer-readable storage medium of claim 13, wherein the steps further include:
determining that the particular hierarchically-organized collection of resources includes a reference to particular referenced data in a shared table, wherein the shared table includes data that is referred to by one or more entities, in the first database system, that are not included in the particular set of database objects; and
in response to determining that the particular hierarchically-organized collection of resources includes the reference to the particular referenced data in the shared table, copying the particular referenced data to a database object of the particular set of database objects.

17. The computer-readable storage medium of claim 13, wherein the steps further include: receiving information for a resource to be added to the particular set of database objects; determining whether the information is of a type consistent with a constraint on resource types to include in the particular set of database objects; and
responsive to determining that the information is of a type consistent with the constraint, the first database system adding the information to one or more database objects of the particular set of database objects.

18. The computer-readable storage medium of claim 17, wherein the steps further include: receiving second information for a second resource to be added to the particular set of database objects;
determining whether the second information is of a type consistent with the constraint on resource types to include in the particular set of database objects; and
responsive to determining that the second information is not of a type consistent with the constraint, the first database system throwing an error.

19. The computer-readable storage medium of claim 13, wherein the particular set of database objects includes one or more database tables indexed by logical identifiers; and
the steps further include associating row identifiers, identifying physical locations for rows in the one or more database tables, with the logical identifiers using one or more index structures included in the particular set of database objects.

20. The computer-readable storage medium of claim 13, wherein the steps further include creating a tablespace for storing data for the particular set of database objects.

21. The computer-readable storage medium of claim 13, wherein the steps further include:
storing a second hierarchically-organized collection of resources in a second set of database objects in the database managed by the first database system, wherein the second hierarchically-organized collection of resources includes one or more second identifiers of one or more second referenced data, and the second set of database objects include the one or more second referenced data;
mounting, to a second subdirectory of the common directory, the second hierarchically-organized collection of resources, stored in the second set of database objects;
receiving a query, in context of the common directory, that requires evaluation over both the particular hierarchically-organized collection of resources and the second hierarchically-organized collection of resources; and
evaluating the query using, at least, the particular set of database objects and the second set of database objects.

22. The computer-readable storage medium of claim 21, wherein evaluating the query further comprises: creating a plurality of sub-queries based on the query; evaluating a first sub-query of the plurality of sub-queries using the particular set of database objects; and evaluating a second sub-query of the plurality of sub-queries using the second set of database objects.

23. A non-transitory computer-readable storage medium storing instructions which, when executed by one or more processors, cause a computing device to perform steps comprising:

storing a first hierarchically-organized collection of resources in a first set of database objects in a database managed by a first database system;

storing a second hierarchically-organized collection of resources in a second set of database objects in the database managed by the first database system;

mounting, to a first subdirectory of a common directory managed by the first database system, the first hierarchically-organized collection of resources, stored in the first set of database objects;

mounting, to a second subdirectory of the common directory, the second hierarchically-organized collection of resources, stored in the second set of database objects, wherein the second subdirectory is different than the first subdirectory;

receiving a query, in context of the common directory, that requires evaluation over both the first hierarchically-organized collection of resources and the second hierarchically-organized collection of resources; and evaluating the query using, at least, the first set of database objects and the second set of database objects.

24. The computer-readable storage medium of claim 23, wherein evaluating the query further comprises: creating a plurality of sub-queries based on the query; evaluating a first sub-query of the plurality of sub-queries using the first set of database objects; and evaluating a second sub-query of the plurality of sub-queries using the second set of database objects.

* * * * *

UNITED STATES PATENT AND TRADEMARK OFFICE
CERTIFICATE OF CORRECTION

PATENT NO. : 8,443,002 B2
APPLICATION NO. : 13/301690
DATED : May 14, 2013
INVENTOR(S) : Chandrasekar et al.

It is certified that error appears in the above-identified patent and that said Letters Patent is hereby corrected as shown below:

In the Claims:

In column 16, line 35, in Claim 19, delete "wherein" and insert -- wherein: --, therefor.

Signed and Sealed this
Twenty-fourth Day of September, 2013

Teresa Stanek Rea
*Deputy Director of the United States Patent and Trademark Office*